United States Patent [19]

Lange

[11] 4,274,756
[45] Jun. 23, 1981

[54] FIXED JOINT, ESPECIALLY FOR JOINING STRUCTURAL PARTS OF WOODEN FURNITURE

[75] Inventor: Gerd Lange, Kapsweyer, Fed. Rep. of Germany

[73] Assignee: Schlaap-Möbel GmbH & Co., KG, Neu-Anspach, Fed. Rep. of Germany

[21] Appl. No.: 959,874

[22] Filed: Nov. 13, 1978

[51] Int. Cl.³ ............................................. F16B 12/00
[52] U.S. Cl. .................................... 403/382; 403/231; 403/347; 403/400
[58] Field of Search ............... 403/347, 381, 354, 231, 403/241, 339, 382, 346, 217, 219, 400, 340, 364; 46/20, 28; 33/112, 114, 478, 479, 480

[56] References Cited

U.S. PATENT DOCUMENTS

| | | | |
|---|---|---|---|
| 419,589 | 1/1890 | Lewis | 403/340 |
| 1,008,262 | 11/1911 | Harvie | 403/231 |
| 2,097,172 | 10/1937 | Yurkovitch | 403/347 X |
| 3,004,364 | 10/1961 | Benkelman | 46/28 X |
| 4,079,995 | 3/1978 | Beckley | 403/217 X |

FOREIGN PATENT DOCUMENTS

| | | | |
|---|---|---|---|
| 686687 | 4/1930 | France | 403/231 |
| 1282647 | 12/1961 | France | 33/112 |
| 313139 | 5/1956 | Switzerland | 403/219 |

OTHER PUBLICATIONS

Article entitled "Mortise and Tenon" from periodical Fine Wood-working, Summer, 1976; 6 pages Primary Examiner—Andrew V. Kundrat
Attorney, Agent, or Firm—Michael J. Striker

[57] ABSTRACT

The fixed joint of construction pieces comprises an intermediate construction piece having two opposite sides provided respectively with concave recesses, a transverse construction piece having a pair of convex surface portions each matching an assigned concave recess in the intermediate piece, and fastening means tightly connecting the two pieces and compressing the convex surfaces against the concave recesses.

15 Claims, 13 Drawing Figures

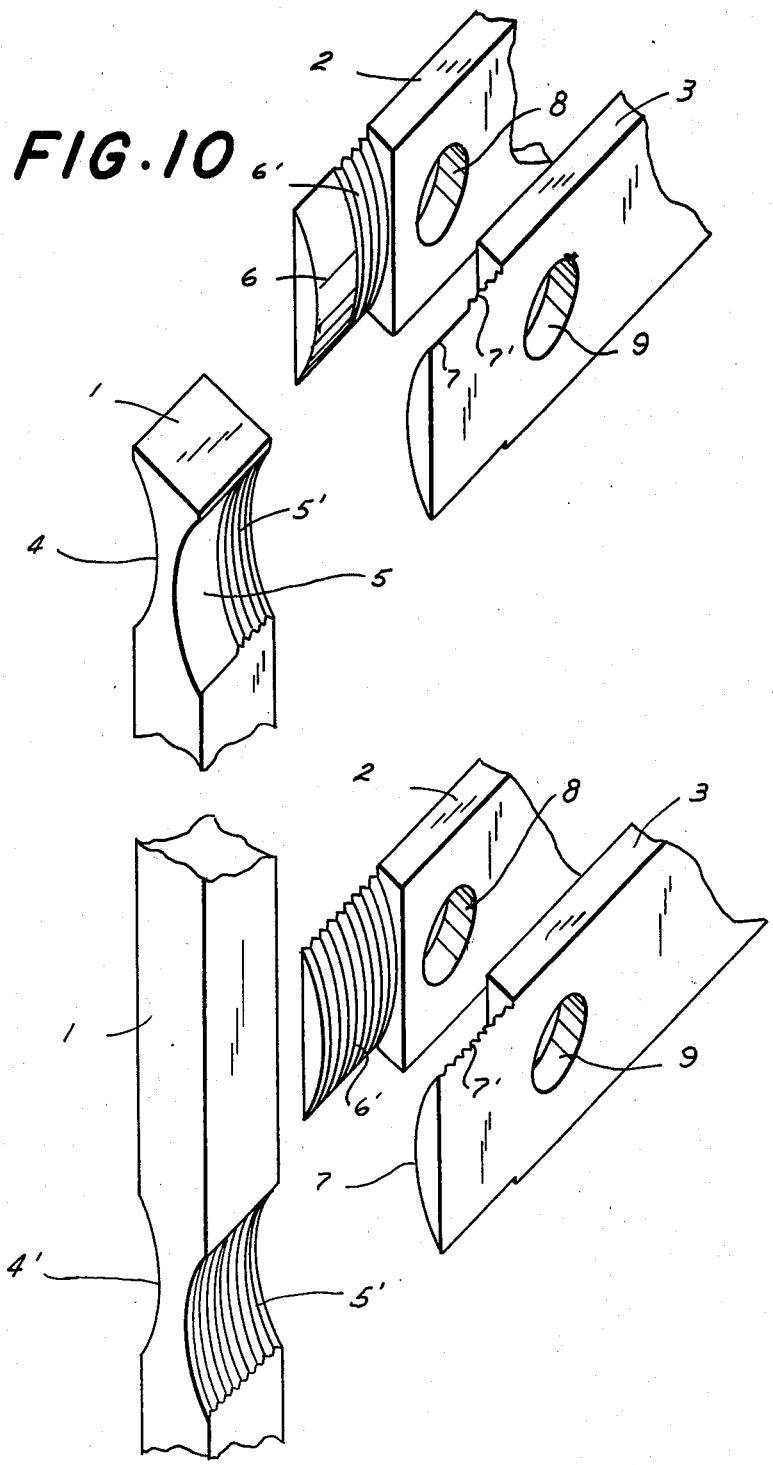

FIXED JOINT, ESPECIALLY FOR JOINING STRUCTURAL PARTS OF WOODEN FURNITURE

BACKGROUND OF THE INVENTION

The invention relates generally to fixed joints for holding several structural parts together and more particularly, it relates to a joint of wooden construction parts, especially for use in the construction of wooden furniture.

In manufacturing wooden furniture, there are necessary, in most cases, frames or other units in which wooden parts are joined at an angle and permanently connected such, as for example, joints in chairs, beds, cabinet doors and cabinet walls. Such joints are needed not only at the ends of corresponding furniture parts but also for example in doors and cabinet walls, for reinforcing the frame structure.

For this purpose different kinds of joints are employed.

In a known method a wooden part has concealed slitted hole or mortice into which is inserted a tenon provided on the wooden part to be joined. In another known method the parts to be connected are provided, instead of mortices and tenons, with one or more round bores into which matching pins are inserted. In still another method one wooden part in the range of the joint is provided with side-by-side arranged rectangular recesses so that a tenon results that extends across the full width of the wooden part. The matching wooden piece is made with a slit or recess corresponding to the width of the tenon and adapted for engaging with the elongated tenon. In more massive boards several tenons and slotted holes are employed.

In a further known method are also used the tenons and slotted holes in the aforementioned manner nonetheless the slotted holes and the tenons have a trapezoidal shape (dovetail joints) to attain an increased loading capacity.

All aforementioned kinds of joints have, however, several disadvantages. Especially in order to create a permanent joint the joint portions have to be glued and in prior-art joints the glued surfaces are relatively small and in most cases an accurate fitting of the joint parts cannot be achieved. In addition, to achieve a satisfactory adhesion of the glued parts it is necessary to press simultaneously in at least two directions the glued parts together. In joining the parts with the application of glue, there is a tendency that during the insertion of one part into the other the glue layer is partially pushed out from the glued surfaces. It accumulates either in front of the inserted tenon and consequently it may easily prevent a snug connection or it is discharged outwardly and looses its function.

Another substantial disadvantage of known joints is the fact that during the natural aging of the wood due to the residual moisture, progressive drying up or due to the exposure of the wooden parts to different temperature or air moisture conditions the danger is that the joint will become loose even after a short period of its use. Furthermore, the leverage of the part connected under an angle, for example in a chair, considerable loads are concentrated mostly on small surfaces of the tenon and this concentration of loads also frequently results in loosening of the joint already after a short period of usage.

To produce fitting joint parts having the required snug quality is in known kinds of joints very laborious and therefore costly. Except the joints consisting of round bores and tenons, the manufacture of slotted holes and tenons carries always the danger that too much wood is unintentionally removed and thus a waste product will result. Due to the notch effect the conventional joints are considerably susceptable to breakage.

As far as the construction is concerned, the known kinds of joints require the application of relatively massive wooden parts resulting in a high consumption of wood; if such joints are used for constructions of parts having small cross-sections, the load capacity of the furniture is impaired. If an additional structural part such as a back of a chair or a door panel of a cabinet is to be fastened to one or more parts united by the joint, it is necessary to take precautions as far as the shape of borings, slots or grooves is concerned or as regards the screw connections and the like.

Finally, in conventional joints it is always disturbing from the aesthetic appearance of furniture pieces when the slotted holes and tenons are visible from the outside.

SUMMARY OF THE INVENTION

It is, therefore, a general object of the present invention to overcome the aforementioned disadvantages.

In keeping with this object, and others which will become apparent hereafter, one feature of the invention resides, in a joint of wooden structural parts for use especially in furniture manufacture, in a combination which comprises an intermediate construction piece having two opposite sides provided with concave recesses, a pair of parallel construction pieces extending transversely to the intermediate construction piece and each having a convex surface portion matching the assigned concave recess in the intermediate piece and fastening means in the form of round or rectangular tenons or pins that are inserted into fitting bores or sockets and therein fastened by glueing, screwing, tight-fitting or by other methods whereby the bores or sockets are created either immediately in the range of the joint to pass both through the massive intermediate wooden piece and through the engaging portions of the transversely directed pair of the wooden lamellae or are made in the lamellae outside the immediately joining surfaces. It has been proved to be particularly advantageous if the bore or socket used for permanently fastening the joint is spaced from the contact area of the two parallel lamellae with the intermediate support in the immediate range of the joint nonetheless as close as possible to the massive intermediate support.

According to this invention the thickness of the lamellae, the radius of the concave recesses in the massive intermediate wooden part and the fitting convex portion of the lamellae as well as the point of application of the convex shapes of the lamellae are selected in accordance with the desired load capacity and/or according to aesthetic points of view so that between the parallel lamellae a different gap can be selected the size of which can be reduced to such an extent that the lamellae contact each other.

Also, according to another feature of this invention the lamellae in the range of the immediate joining surfaces with the intermediate massive construction part can project beyond one or more outer surfaces of the latter.

As far as the joint of this invention is employed with objects that require the application of further angularly-shaped longitudinal or transverse wooden structural pieces, such as, for example, in chairs, tables, beds and the like, these additional pieces can also be used according to this invention for uniting additional intermediate massive wooden structural parts and pairs of wooden lamellae by providing the end side of the longitudinal or transverse wooden piece that faces the joint according to this invention with round or rectangular tenons that are inserted into the bores or sockets in the lamellae and fastened in those sockets by glueing, screwing, bracing or other suitable manner. By this means a permanent rigid fixation of these additional longitudinal or transverse wooden parts is achieved that makes other measures for fastening unnecessary.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 10 is a joint of this invention having serrated contact surfaces.

DESCRIPTION OF THE PREFERRED EMBODIMENTS

Figure 1:
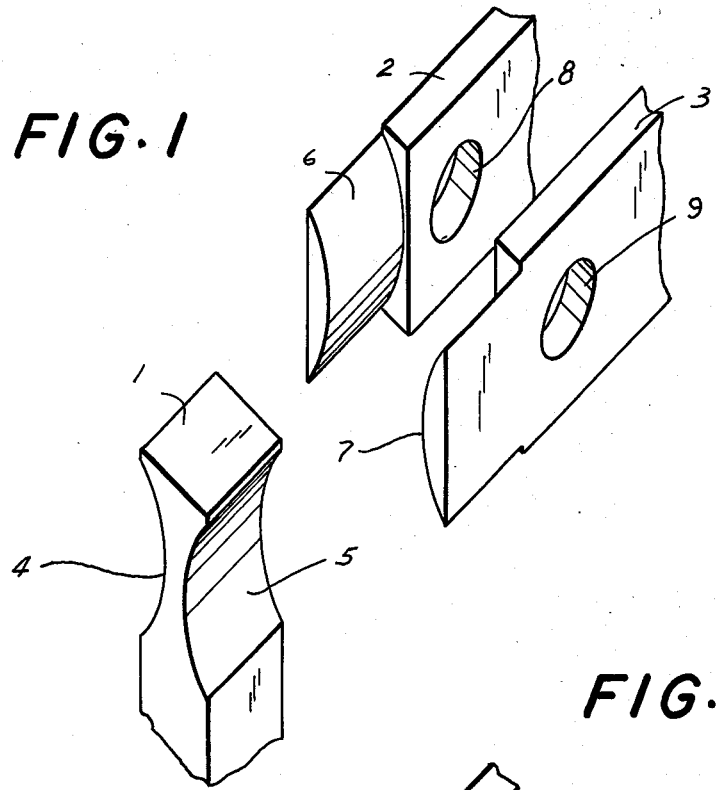
FIG. 1 shows in a perspective view the arrangement of wooden construction pieces, prior to their assembly and without the connecting tenon, for making a corner joint according to this invention.
Figure 1A:
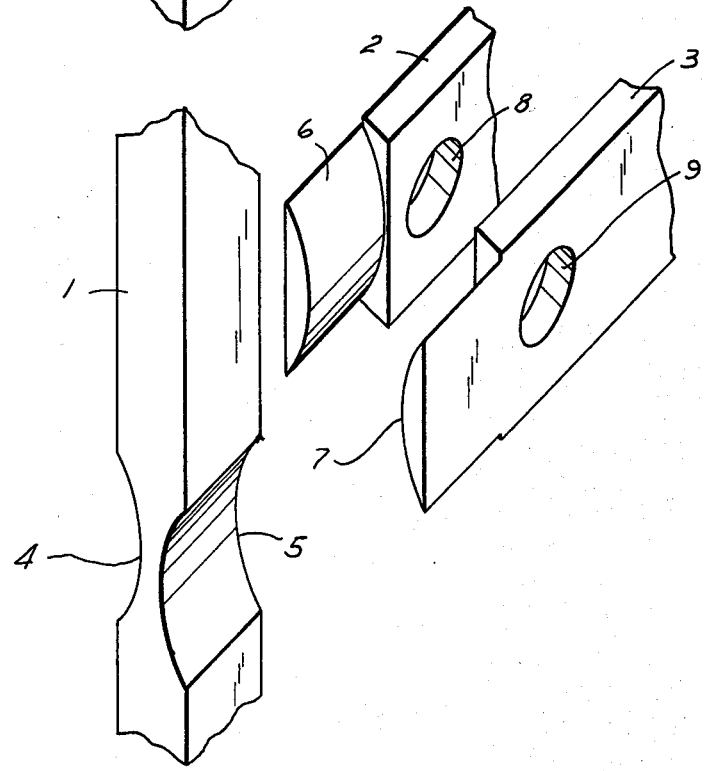
FIG. 1a is a view similar to FIG. 1 showing construction pieces for making a middle joint according to this invention.
Figure 2:
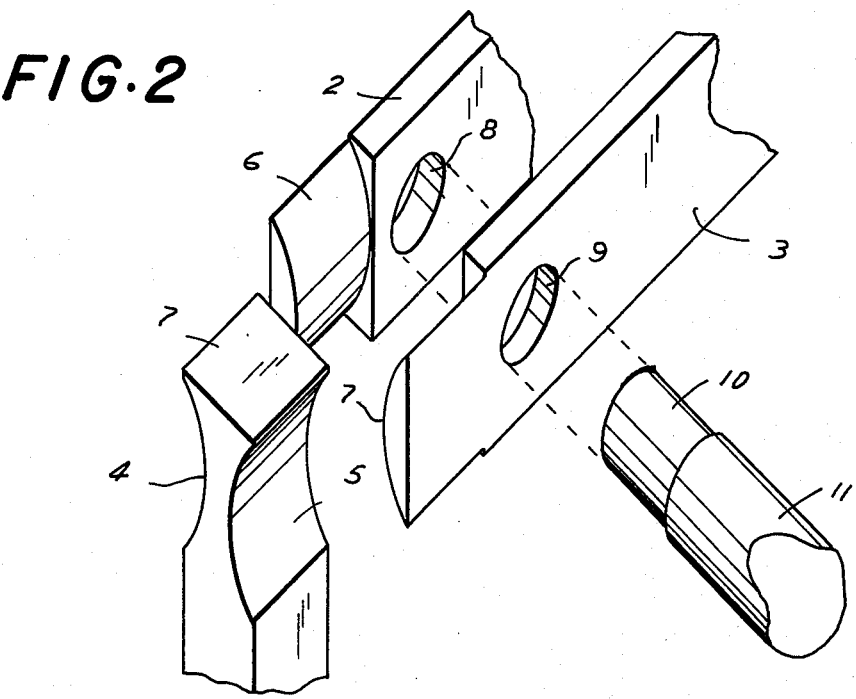
FIG. 2 shows the wooden construction pieces of FIG. 1 with a round connection tenon or pin insertable into corresponding round bores in the transverse pieces.

The joint parts as illustrated in FIGS. 1 through 8 include a massive wooden part 1 and two wooden lamellae (transverse bars) 2 and 3 extending parallel one to another and connectable to the massive wooden part at right angles. The opposite sides of the intermediate massive construction part 1 are provided in the range of the union with the lamellae 2 and 3 with concave recesses 4 and 5 into which are inserted correspondingly shaped convex surfaces 6 and 7 formed on facing sides of respective lamellae 2 and 3. The radius of the convex surfaces 6 and 7 corresponds to the radius of the concave recesses 4 and 5 on the massive intermediate structural piece 1.

Figure 3:
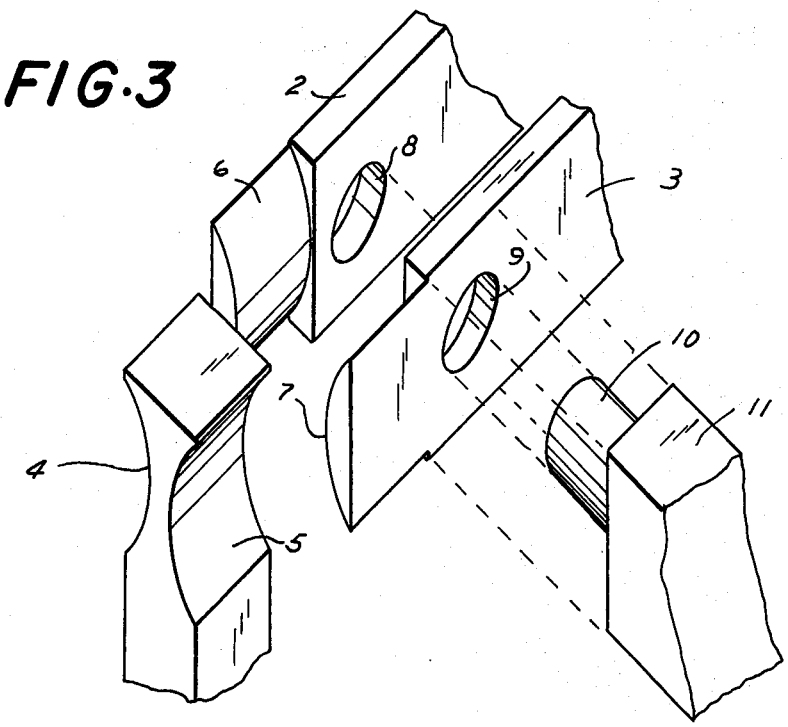
FIG. 3 is similar to FIG. 2 except that the connecting pin is formed as a tenon on a transverse rectangular beam.
Figure 4:
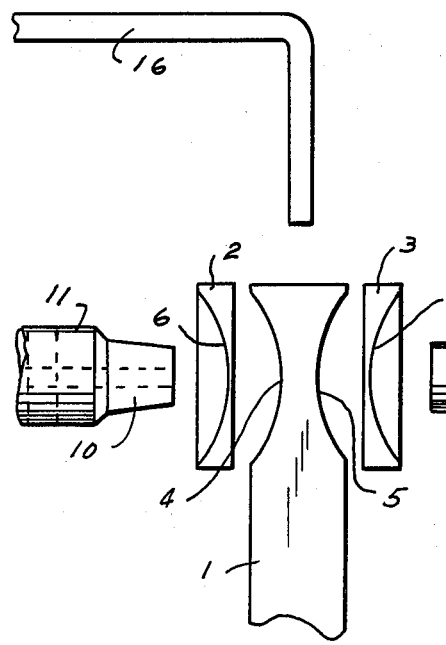
FIG. 4 shows a front view of the joint of this invention with an additional construction piece and a socket for fastening means.
Figure 4A:
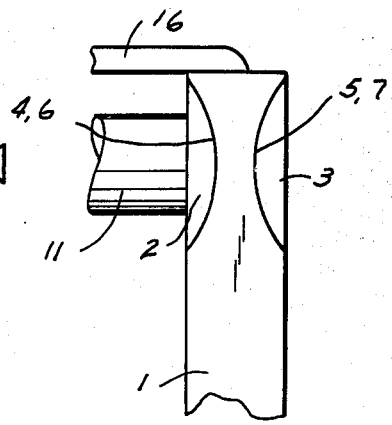
FIG. 4a shows the joint of FIG. 4 in assembled condition.
Figure 5:
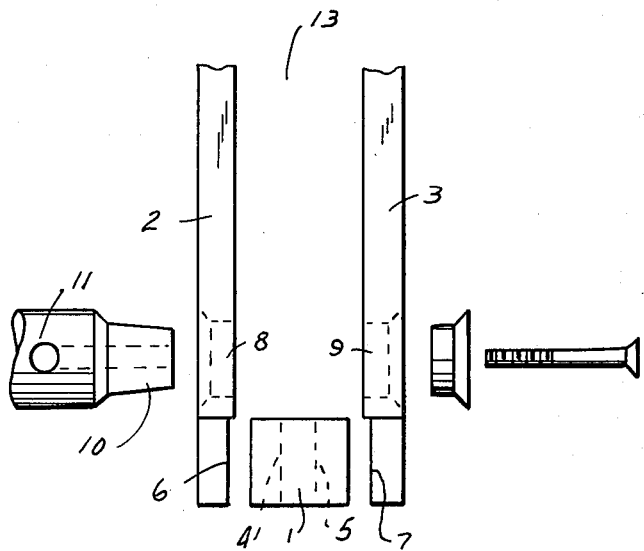
FIG. 5 is a modification of the joint of FIG. 4.
Figure 5A:
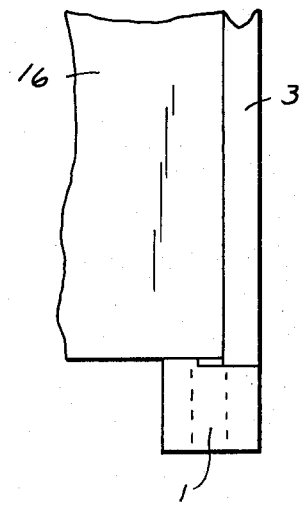
FIG. 5a shows the joint parts of FIG. 5 in assembled condition.
Figure 6:
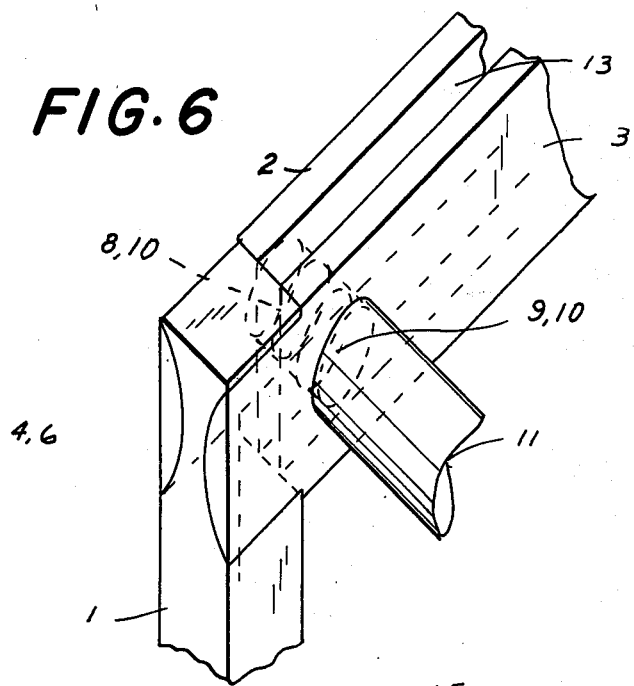
FIG. 6 shows the joint parts of FIG. 2 in assembled condition.

The lamellae 2 and 3 are further provided with aligned bores 8 and 9 respectively located in close proximity to the mating curved surfaces. As seen from FIGS. 2 and 6, upon insertion of the convex portions 6 and 7 of the lamellae into the complementary recesses in the piece 1, a round connection pin or tenon 10 is introduced into those bores 8 and 9. In this example the connection tenon or pin 10 is formed at the end of a round transverse beam 11 or at the end of a rectangular transverse beam 11 (FIG. 3). The pin 10 is secured in position in the bores 8 and 9 by glueing, by a simple tight fitting or by means of sockets and screws.

Figure 7:
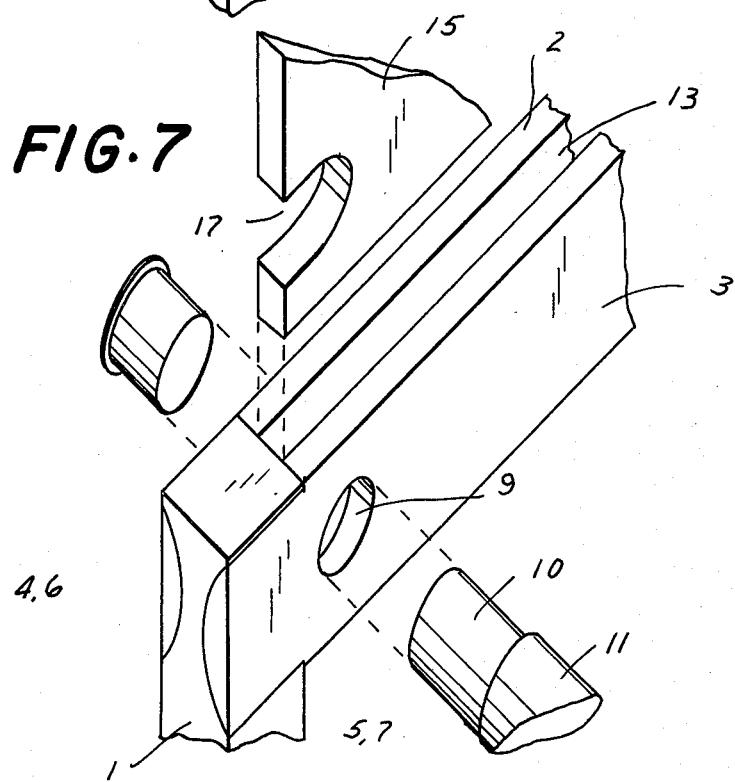
FIG. 7 is a modification of the joint of FIG. 2 showing the fastening of the connecting pin by means of screws and further including an additional piece insertible into the gap between the parallel lamellae.
Figure 8:
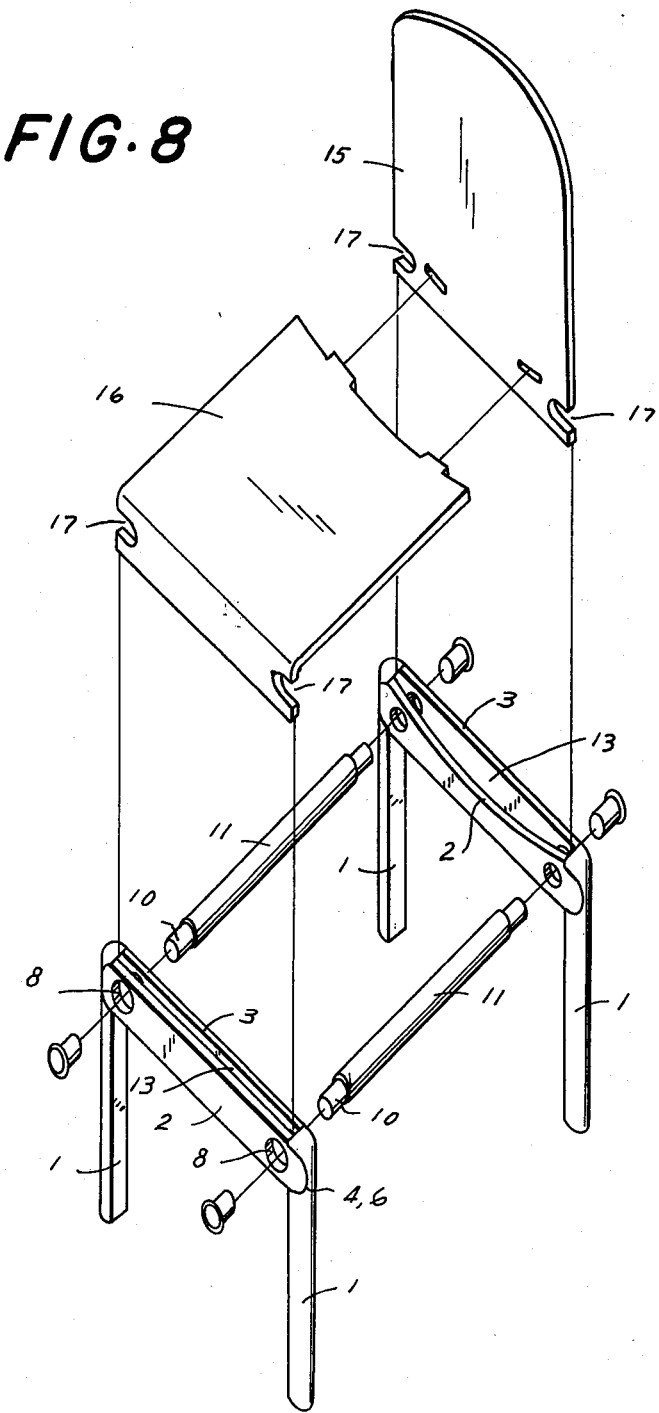
FIG. 8 is an exploded view of part of a chair including joints according to this invention.

The parallel lamellae 2 and 3 upon completion of the assembly of the joint of this invention can be spaced apart from one another to form a gap 13. As illustrated in FIGS. 7 and 8 the gap 13 can be used for accomodating additional structural parts 15 and 16 that in the case of a chair, for example, may form, respectively, a backrest and a seat and are simply inserted into the gap. In using the joint according to this invention for manufacturing doors, cabinet doors, cabinet side walls in which the lamellae 2 and 3 provided with two joints according to this invention extend at the upper end or along both longitudinal sides of the doors or walls, the gaps 13 serve for receiving the door panels whereby these panels are only inserted in the gap 13; as far as such doors are further reinforced by additional transverse or longitudinal beams made of lamellae 2 and 3 joined to an intermediate massive wooden piece 1 by the joint according to this invention, it is also possible to employ a single door panel since the gap 13 also in the reinforcing beam permits without obstacles a simple insertion of the panel.

Preferably, nonetheless not necessarily, the backrests, door panels or other parts inserted into the gap 13 are provided with lateral recesses 17 adjusted in shape to the bores 8 and 9 in the lamellae 2 and 3 so that the connection tenon or pin 10 upon insertion in the bores or sockets 8 and 9 passes also through the recesses 17 and the backrest of the chair and the like are fixedly secured in position in the gap 13.

It is particularly advantageous nonetheless not necessary for the creation of a durable joint having a high load capacity when the massive wooden construction piece 1 and the transverse parallel lamellae 2 and 3 are additionally fastened in the range of the joint of this invention by glue. It is also possible according to this invention when instead of tenons or pins 10 passing through bores (sockets) 8 and 9 tap screws, conventional bolts with counternuts or also tie bands are used for fastening the joint.

Figure 9:
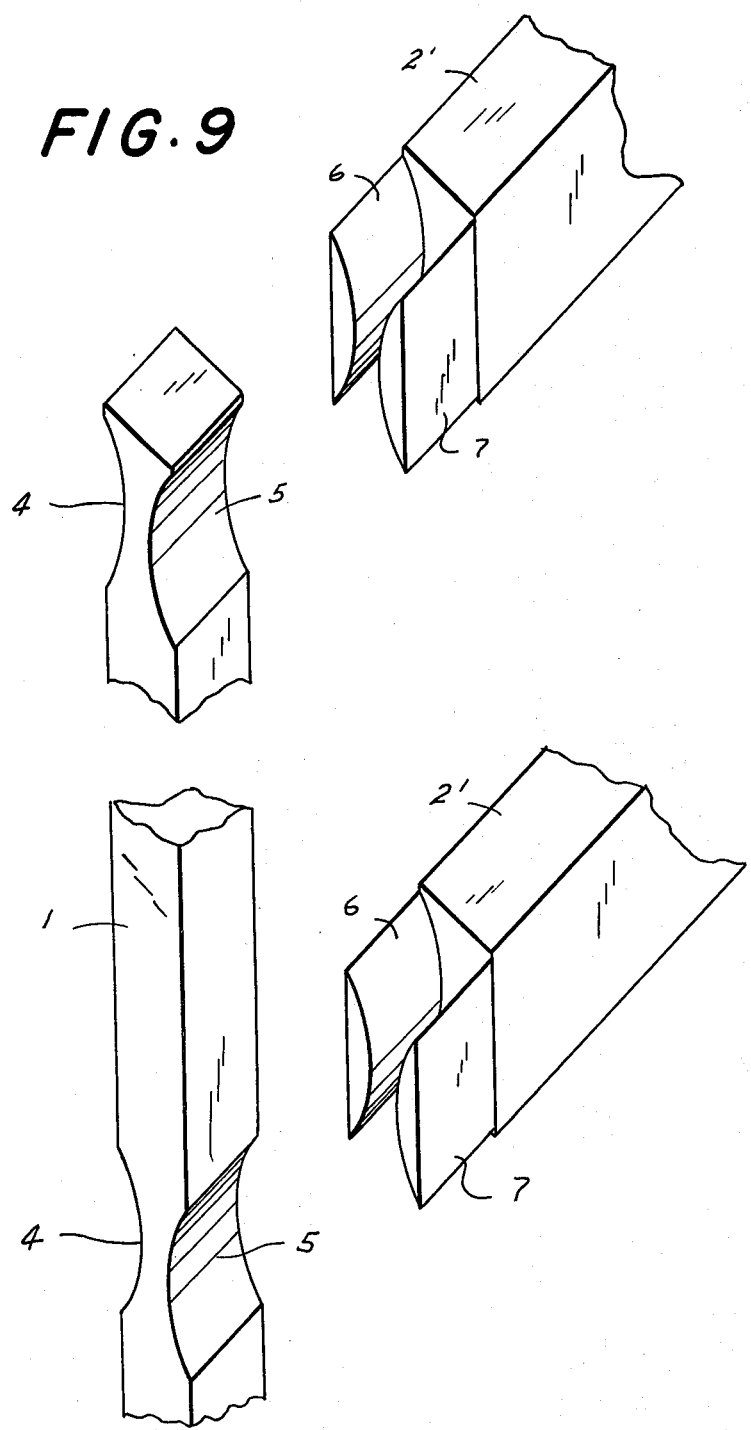
FIG. 9 is a modification of FIG. 1 showing a joint consisting of two construction pieces.

As illustrated in FIG. 9, instead of using two parallel wooden lamellae 2 and 3 a single transverse construction piece 2' of massive wood is employed having two juxtaposed convex surfaces 6 and 7 matching the concave recesses in the supporting massive part 1.

In a further elaboration of this invention it has been found to be of particular advantage when the convex and concave surfaces of the joint or at least facing positions thereof are provided with serrations 4', 5', 6' and 7' as shown in FIG. 10, or with complementary indentations which increase contact area of these surfaces.

In comparison with conventional joints of wooden construction parts, the joint according to this invention has the following advantages:

The novel joint that is suitable particularly for furniture, is more durable and resistant to loads. By the combination of the concave recesses in the intermediate massive piece with the concave bulging portions of the parallel lamellae the effective mating surfaces of the joint which during the load are subjected to push and pull are considerably increased relative to conventional kinds of joints. Since at the same time no sharp edges occurring in conventional pin-and-hole joints take place, the danger of unintentional splitting off the wood or even the ruptures in the area of the slotted holes and tenons is avoided.

A further considerable advantage of the joint of this invention in comparison with conventional joints is the fact that by combining the massive intermediate wooden piece with relatively thin wooden lamellae formed the joint parts according to this invention, the changes in dimensions of the massive piece and/or of the lamellae due to the natural aging of the wood and due to residual moisture, successive drying-up or by using the pieces under different temperature and air moisture conditions, are compensated by means of a locking effect comparable to that of a wedge of wood. This compensation of changes in size occurs also when the convex and concave surfaces of the joint are glued together. The formation of cracks due to the drying of the wood is avoided. By using thin wooden lamellae the danger of residual moisture in wood and thereby dimensional changes of the lamellae relative to the massive wooden piece are at least considerably reduced.

Moreover, the manufacture of the joint according to this invention is simpler and more economic than the manufacture of conventional joints. Both the concave recesses in the massive wood as well as the convex configuration of the lamellae can be freely shaped from the outside and do not require the machining of the wood inwardly so that an increased quality of the snug fit of the joint parts is attainable. By using the lamellae and only one structural piece of massive wood the wood consumption is reduced and consequently the reduction of production cost of the corresponding furniture pieces is achieved.

It is true that the cementing or glueing of the convex and concave surfaces is advantageous for attaining an increased stability nonetheless the use of adhesive is not indispensible as in conventional kinds of joints because the lamellae due to the concave joint portion in the supporting part of massive wood defining an upwardly directed expansion, cannot be dismounted from the completed joint in any direction as soon as the parts have been tied together by means of the bore (socket) and pin connections or by other above-described means.

If the convex and concave mating surfaces of the joint are additionally glued together so even in this case advantages in comparison with conventional joints will result. First of all substantially increased adhesive surfaces are available since in known joints the glue on the cross-cut surfaces adheres poorly. By glueing the surfaces in the joint of this invention an additional advantage takes place, namely that it is sufficient to press the parts together in only one direction since the convex portions of the lamellae upon compression against the concave surfaces of the massive wooden piece align themselves to the curved surfaces of the joint. During this compression no accumulation of pushed-out glue takes place since the excessive glue is driven outwardly without diminishing the mating surfaces of the joint.

A further technological simplification and economic reduction in price in comparison with known kinds of joints results from the utilization of the gap between the two parallel lamellae for securing in position additional parts such as chair seats, chair backrests, disc plates, door panels, beds, panelling and so on, by simply inserting or suspending those parts into the gap between the lamellae. At the same time the width of the gap can be adjusted to the interposed parts by suitably changing the radius of the convex joint portions of the lamellae provided that the thickness of those additional parts is predetermined. This possibility is especially advantageous if the additional parts are of plastic material such as, for example, chair seats and table panels the ends of which are simply shaped at an angle to attain reliable mounting.

Another advantage of the joint of this invention resides in the possibility to apply intermediate studs without the necessity to divide the inserted panels for doors of cabinets, for example. In the known joint in contrast, it is necessary to subdivide those panels and still provide separate rabbet joints. By simply inserting the original pieces into the gap between the lamellae it is no longer necessary to finish the sides of the additional piece to match accurately the gap so that the cost is further reduced.

For assembling and holding in position the lamellae and the intermediate construction piece of massive wood it is possible to use instead of a separate connection pin passing through the bores (sockets) in the lamellae a tenon provided at the end of the additional longitudinal or transverse structural pieces of wood that form a part of the entire structure and in this way these additional pieces are rigidly fixed and connected by the joint of this invention.

The joint of this invention represents an additional progress in providing a possibility for the user of the furniture using the joint to assemble the furniture himself as far as the glueing of the joint is not essential and the joint can be assembled only by screwing the parts together.

Finally, the joint has advantages from the aesthetic point of view in comparison with known embodiments. After assembling, the joints due to the visible marginal parts of the concave and convex surfaces produce a harmonic appearance especially when the outer surfaces of the lamellae are levelled with the outer surfaces of the massive structural piece.

It will be understood that each of the elements described above, or two or more together, may also find a useful application in other types of constructions differing from the types described above.

While the invention has been illustrated and described as embodied in a joint for use with wooden construction pieces, it is not intended to be limited to the details shown, since various modifications and structural changes may be made without departing in any way from the spirit of the present invention.

What is claimed as new and desired to be protected by Letters Patent is set forth in the appended claims:

1. A joint of a plurality of construction pieces, comprising a first joint portion including a pair of concave recesses provided on opposite sides of one of said construction pieces; a second joint portion including a pair of facing convex surfaces provided on at least one of the other construction pieces, said convex surfaces snugly fitting said concave recesses when said other construction piece is joined transversely to said one construction piece; and connecting means for securing said convex surfaces in said concave recesses.

2. A joint as defined in claim 1, wherein said facing convex surfaces are made in a single construction piece.

3. A joint of a plurality of construction pieces, comprising a first joint portion including a pair of concave recesses formed on opposite sides of one of said construction pieces; a second joint portion including a pair of other construction pieces arranged parallel one to another and each having a convex surface snugly fitting said concave recesses when said other construction pieces are joined transversely to said one construction piece; and means for connecting said other construction pieces and thus securing said convex surfaces in said concave recesses.

4. A joint as defined in in claim 3, wherein said convex surfaces and said concave surfaces in their whole scope or in parts of them are indented.

5. A joint as defined in claim 3, wherein said connecting means includes aligned bores provided respectively in said other construction pieces and a connection pin snugly fitting into said bores.

6. A joint as defined in claim 5, wherein said pin is secured in position in said bores by glueing.

7. A joint as defined in claim 3, wherein said connecting means include aligned bores passing through said one construction piece and said other construction pieces in the contact area of said convex and concave surfaces and a connection piece snugly fitting said bores.

8. A joint as defined in claim 4, wherein said convex and concave surfaces are glued together.

9. A joint as defined in claim 4, wherein said connecting pin is formed on an end portion of a transverse beam.

10. A joint as defined in claim 3, wherein said recessed concave surfaces and said convex surfaces are at least partially serrated.

11. A joint as defined in claim 3, wherein said connecting means includes aligned bores provided respectively in said two parallel construction pieces, apart from said one construction piece, and a connection member snugly fitting into said bores.

12. A joint of a plurality of construction pieces, comprising a first joint portion including a pair of concave recesses provided on opposite sides of one of said construction pieces; a second joint portion including a pair of facing convex surfaces provided on at least one of the other construction pieces, said convex surfaces snugly fitting said concave recesses when said other construction piece is joined transversely to said one construction piece; and connecting means for securing said convex surfaces in said concave recesses, said connecting means including binding elements wound at least around said other construction pieces.

13. A joint as defined in claim 12, wherein said binding elements include tie bands, wires or strings made of metal, plastic or textile material.

14. A joint of a plurality of construction pieces, comprising a first joint portion including a pair of concave recesses provided on opposite sides of one of said construction pieces; a second joint portion including a pair of facing convex surfaces provided on at least one of the other construction pieces, said convex surfaces snugly fitting said concave recesses when said other construction piece is joined transversely to said one construction piece; and connecting means for securing said convex surfaces in said concave recesses, said connecting means including aligned bores provided respectively in said other construction pieces and a connection pin snugly fitting into said bores, and wherein said connecting means further include a socket for accommodating bolts fastening said pin to said other construction pieces.

15. A joint of a plurality of construction pieces, comprising a first joint portion including a pair of concave recesses provided on opposite sides of one of said construction pieces; a second joint portion including a pair of facing convex surfaces provided on at least one of the other construction pieces, said convex surfaces snugly fitting said concave recesses when said other construction piece is joined transversely to said one construction piece; and connecting means for securing said convex surfaces in said concave recesses, and wherein said pair of parallel construction pieces defines a gap therebetween adapted for receiving an additional construction piece.

* * * * *